US006889579B1

(12) United States Patent  
Brown (10) Patent No.: US 6,889,579 B1
(45) Date of Patent: May 10, 2005

(54) ADJUSTABLE GRIPPING TOOL (75) Inventor: Daniel P. Brown, Palos Park, IL (US)

(73) Assignee: Loggerhead Tools LLC, Palos Park, IL (US)

( * ) Notice: Subject to any disclaimer, the term of this patent is extended or adjusted under 35 U.S.C. 154(b) by 0 days.

(21) Appl. No.: 10/763,489

(22) Filed: Jan. 23, 2004

(51) Int. Cl.$^7$ ............................................. B25B 13/28
(52) U.S. Cl. ............................. 81/90.2; 81/58; 81/90.1
(58) Field of Search ....................... 81/90.2, 58, 90.1, 81/90.3, 90.5, 91.1, 126, 128

(56) References Cited

U.S. PATENT DOCUMENTS

| | | | |
|---|---|---|---|
| 599,837 A | 3/1898 | Harris | |
| 877,773 A | 4/1908 | Holm | |
| 912,117 A | 2/1909 | Green | |
| 1,393,267 A | 10/1921 | Cousins | |
| 2,096,016 A | 10/1937 | Weishampel | |
| 2,292,391 A | 8/1942 | Merriman et al. | |
| 2,409,549 A | 10/1946 | Djidics | |
| 2,547,534 A | 4/1951 | Oliver | |
| 2,580,247 A | 12/1951 | Secondi et al. | |
| 2,714,827 A * | 8/1955 | Kusiv et al. .................. | 72/402 |
| 2,753,742 A * | 7/1956 | Buchanan .................... | 72/402 |
| 2,787,925 A | 4/1957 | Buchanan | |
| 2,884,826 A | 5/1959 | Bruhn | |
| 3,177,695 A | 4/1965 | Van Oort | |
| 3,226,968 A | 1/1966 | Holmes | |
| 3,664,213 A | 5/1972 | Anati | |
| 3,713,322 A * | 1/1973 | Fischer .................... | 72/409.09 |
| 3,901,107 A | 8/1975 | Halls | |
| 4,112,792 A | 9/1978 | Guimarin | |
| 4,277,991 A | 7/1981 | Stubenrauch | |
| 4,333,357 A | 6/1982 | Vinther | |
| 4,724,730 A | 2/1988 | Mader et al. | |
| 4,793,225 A | 12/1988 | Berkich | |
| 4,813,309 A | 3/1989 | Kang | |
| 5,067,376 A | 11/1991 | Fossella | |

(Continued)

FOREIGN PATENT DOCUMENTS

EP          0 543 815          5/1992

*Primary Examiner*—Joseph J. Hail, III
*Assistant Examiner*—Alvin J. Grant
(74) *Attorney, Agent, or Firm*—Vedder Price Kaufman & Kammholz (57) ABSTRACT

A self-energizing and de-energizing adjustable gripping tool for engaging a workpiece to impart movement thereto includes a first element and second element connected for relative angular movement. The second element includes an actuation portion having a plurality of slots. Each of the slots includes a first section and a second section wherein the first and second sections each define divergent paths. The first element includes a gripping portion having a plurality of gripping elements and a plurality of aligning elements. Each gripping element has a pin connected thereto. One of the aligning elements is disposed between a pair of adjacent gripping elements. One of the force transfer elements engages one first section and one of the aligning elements engages one second section such that movement of the second element relative to the first element results in the first sections contacting each of the force transfer elements to actuate the gripping elements and the second sections contacting the aligning elements to maintain orientation of the first element with respect to the second element.

26 Claims, 8 Drawing Sheets

U.S. PATENT DOCUMENTS

| | | |
|---|---|---|
| 5,076,121 A | 12/1991 | Fossella |
| 5,090,273 A | 2/1992 | Fossella |
| 5,207,129 A | 5/1993 | Fossella |
| 5,235,878 A | 8/1993 | Young |
| 5,249,490 A | 10/1993 | Kennel |
| 5,261,263 A * | 11/1993 | Whitesell ............ 72/409.19 |
| 5,305,670 A | 4/1994 | Fossella et al. |
| 5,377,566 A | 1/1995 | Mandigo |
| 5,448,931 A | 9/1995 | Fossella |
| 5,531,549 A | 7/1996 | Fossella |
| 5,819,607 A | 10/1998 | Carnesi |
| 5,893,306 A | 4/1999 | Owoc |
| 5,957,010 A | 9/1999 | Petts |
| 6,073,522 A | 6/2000 | Carnesi |
| 6,164,107 A | 12/2000 | Korba, Jr. |
| 6,227,076 B1 | 5/2001 | Murray |
| 6,341,544 B1 | 1/2002 | Falzone |
| 6,530,298 B1 | 3/2003 | Steffe |
| 2002/0144575 A1 | 10/2002 | Niven |
| 2003/0121376 A1 | 7/2003 | Huang |

* cited by examiner

ADJUSTABLE GRIPPING TOOL

BACKGROUND OF THE INVENTION

This invention pertains to a hand tool and more particularly, to an adjustable gripping tool which, as a result of manual operation, self-energizes, automatically configures to engage differently dimensioned and shaped workpieces and de-energizes upon release of actuating force.

Various types of adjustable gripping tools are known in the art. Specifically, several known adjustable gripping tools are embodied in the form of a "crescent" wrench, an adjustable socket wrench, pipe wrench, vice grips, crimpers, bolt and nut cutters, pipe and tube cutters, and various other "plier-type" gripping tools. A crescent wrench is an adjustable open end wrench that has stationary rotatable screw which engages a toothed rack formed on a first jaw element movable with respect to the second jaw element extending from the first element. The adjustable socket wrench includes a shell housing movable elements, such that movement of the first element with respect to the shell causes the elements to move with respect to the shell in order to engage the workpiece. One cutting tool version has adjustable cutting jaws that when tightened and rotated around a tube score and cut the tube. Another version of the cutting tool uses a blade cutting mechanism. The plier-type devices include a pair of first elements connected in such a manner so as to move at least two jaws toward one another in order to engage the workpiece. The crimping tools provide various functions, such as specialty segmented dies that expand or contract via interaction of a tapered boy with a fixed diameter or a plier-type device crimper with jaws that have been modified as a special head to crimp the workpiece.

Each of the prior art devices have disadvantages. The crescent wrench is not automatically resizable during use. The socket device is limited in its effective range of dimensional capability. In other words, a large number of sockets is needed to service a relatively standard range of workpieces, the workpieces must have a standard configuration and the workpieces must be engaged axially.

The plier-type devices fail to engage the workpiece evenly around or within the circumference with proper offsetting forces and stability which aides in operation of the tool. The plier-type devices also concentrate the applied mechanical forces in a point-loading configuration creating pressure points and stress risers on the workpiece surface.

The tube cutting devices cannot be used with one hand. Another disadvantage of tube cutting devices, in particular, knife blade cutters, is that the tubing is often distorted as a result of the asymmetrical cutting forces applied by the blade against the tube. Other tube cutting devices, such as screw-and-wheel-type tube cutters require continuous rotation of the cutting wheel around the circumference of the tube while simultaneously increasing the force applied by the cutting wheel to the tube in order to increase the cutting depth.

Prior art crimping devices cannot create symmetrically balanced crimps with a simple hand tool. For example, crimping a metal sleeve on a hydraulic hose requires a press and a proper die for proper application. Also all of the previously available gripping tools either loosely hold the workpiece or hold the workpiece in a manner that concentrates and focuses the gripping forces in a point pressure-loading configuration. This concentration of gripping forces is on certain points concentrates the force and serves to oftentimes deform the workpiece. Also the previously available tools for wrench applications could not be easily sized to the workpiece.

Therefore, there exists a need in the prior art for an adjustable gripping tool which, as a result of manual operation, self-energizes the tool action, may be automatically sized and resized to engage a workpiece, de-energizes upon release of actuation force, that has a broad range of dimensional capability, engages workpieces axially and radially and provides offsetting forces for stability in operation. Beyond the ability to resize the gripping range, the gripping tool of the present invention symmetrically translates the force applied to the gripping tool onto the workpiece in a symmetrically balanced and mechanically advantaged and efficient way. Thus, an even distribution of gripping and rotational force about the workpiece is achieved; whereby allowing for the most efficient distribution of mechanical stress about the workpiece. For any given force required to manipulate the workpiece the present invention will accomplish the work with the minimal distortion of the workpiece by distributing the work force over the largest area of the workpiece. Other advantages of the adjustable gripping tool of the present invention include decreased costs, increased productivity and multi-access engagement of the workpiece resulting in a mechanically advantaged, efficient, even and balanced distribution of working forces.

BRIEF DESCRIPTION OF THE DRAWINGS

In the course of the following detailed description, reference will be made to the attached drawings, wherein like reference numerals identify like parts and in which.

DETAILED DESCRIPTION OF A PREFERRED EMBODIMENT OF THE INVENTION

One principal aspect of the present invention is directed to an adjustable gripping tool for engaging a workpiece to impart work thereto. The gripping tool includes a first element and a second element connected for a relative angular movement which when activated generates movement of at least one gripping or workpiece engaging element. The first element includes a gripping portion configured to engage the workpiece including a first opening, at least one guide extending from the first opening and at least one gripping element. Each at least one gripping element includes a body portion adapted for engaging a workpiece, an arm portion configured to engage one of the guides and a force transfer element contiguous with the arm portion. The second element includes an actuation portion having a second opening concentric with the first opening and at least one slot disposed adjacent the second opening. Each of the slots has a first section configured to engage one of the force transfer elements such that movement of the second element with respect to the first element simultaneously actuates each at least one first section to contact and move one of the force transfer elements thereby actuating the gripping elements along the guides.

Yet another principle aspect of the present invention is directed to an adjustable gripping tool for engaging a workpiece to impart work thereto which includes a first element and a second element connected for relative angular movement. The second element includes an actuation portion having a plurality of slots. Each of those slots includes a first section and a second section wherein the first and second sections each define divergent paths. The first element includes a gripping portion having a plurality of gripping elements and at least one alignment element. Each gripping element has a force transfer element contiguous therewith. Each of the aligning elements is disposed between a pair of gripping elements. One of the force transfer elements engages one first section and one of the aligning elements engages one second section such that movement of the second element relative to the first element results in the first sections contacting each of the force transfer elements to actuate the gripping elements and the second sections contacting the aligning elements to maintain orientation of the first element with respect to the second element.

Figure 1:
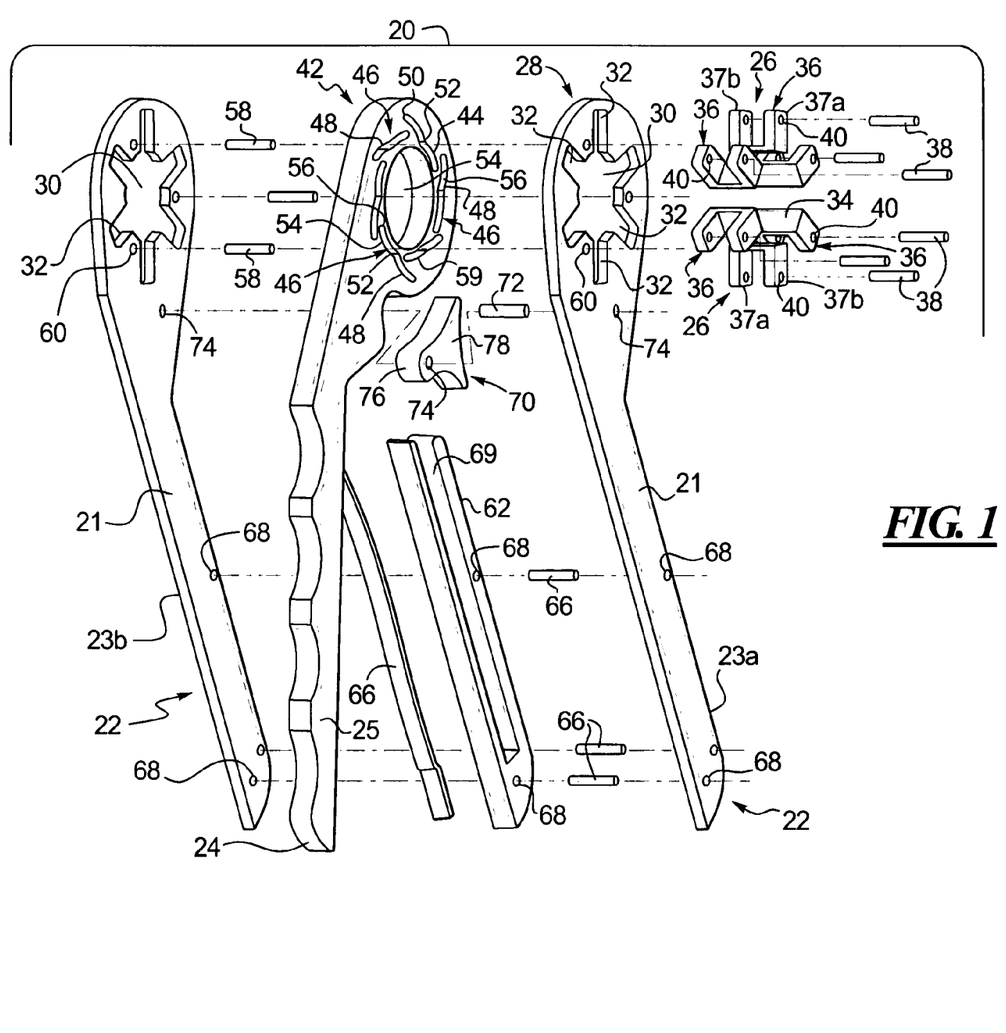
FIG. 1 is an exploded perspective view of an adjustable gripping tool in accordance with the principles of the present invention.

FIG. 1 illustrates in an exploded perspective view of the adjustable gripping tool 20 in accordance with principles of the present invention. The adjustable gripping tool 20 primarily includes a first element 22 and a second element 24 connected for relative angular movement. In one embodiment of the present invention, the first element 22 includes a pair of elements 23A, 23B disposed on opposing sides of the second element 24. It is within the teachings of the present invention that the first element 22 may be configured with a single element 23A or 23B, or as a pair of elements 23A, 23B as may be desired with respect to other design factors of importance to one of skill in the art. The first element 22 includes a first grasping portion 21 and the second element 24 includes a second grasping portion 25. The relative angular movement between the first element 22 and the second element 24 generates concentric linear movement of the gripping elements 26.

The first element 22 further includes a gripping portion 28 disposed at one end of the first grasping portion 21 and configured to engage the workpiece (not shown) including a first opening 30, a plurality of guides 32 extending radially from the first opening 30 and the gripping elements 26. The gripping elements each include a body portion 34 adapted for engaging the workpiece, an arm portion 36 configured to engage one of the guides 32 and a force transfer element 38 connected to the arm portion 36. It is within the teachings of the present invention that the gripping elements may be integrally formed in any suitable manner.

In one embodiment of the present invention, the arm portion 36 of the gripping elements 26 further include a pair of arms 37A, 37B disposed at opposite ends of the body portion 34 such that the gripping elements 36 are substantially U-shaped. It will be recognized by those of skill in the art that the pair of arms 37A, 37B, when so provided engaged the respective guides 32 formed in the first element elements 23A, 23B, respectively. The pair of arms 37A, 37B each include an aperture 40 aligned such that one of the force transfer elements 38 is contiguous therewith for positioning and actuation of the gripping elements 26 as detailed below.

It is within the teachings of the present invention that the gripping elements may have a smooth or rough face with which to engage the workpiece, as desired. For example, the rough face may have a grooved, serrated, checked or any other suitable finish. Furthermore, the force transfer elements 38 may be configured as pins or other suitable structure to provide the functions as described herein. Moreover, the first element and/or each of the elements thereof may often be referred to as a handle and the second element may often be referred to as a lever. It will be recognized by those of skill in the art that the terms used herein are not of a limiting sense. Rather, these terms are used to broadly describe the structure and function herein.

The second element 24 further includes an actuation portion 42 disposed at one end of the second grasping portion 25 and having a second opening 44 concentric with the first opening 30 and a plurality of slots 46 disposed adjacent the second opening 44. Each of the slots 46 has a first section 48 configured to engage one of the force transfer elements or pins 38 such that movement of the second element 24 with respect to the first element 22 simultaneously actuates the first sections 48 to contact and move the force transfer elements 38 along a path defined by the first section thereby actuating the gripping elements 26 along the guides 32. It will be recognized by those of skill in the art that the first sections 48 define a path which generally decreases in terms of radial measurement from a center of the second opening 44 from a first outer end 50 to an inner end 52. In another embodiment, the paths may generally increase in terms of radial measurement from the center of the second opening 44 such that relative movement between first and second elements generates an outward motion of the gripping elements. Alternatively, the guides, slots and force transfer element may be configured to interact in a number of different ways to move the actuation elements into movement with the gripping or workpiece engaging elements. For example, a pair of slots may be formed in a pair of cooperative second elements where each slot defines an arcuate path and the pair of slots simultaneously act on the force transfer member to effect movement thereof.

In one embodiment, each of the slots 46 further includes a second section 54 extending from the first section 48. It will be recognized by those of skill in the art that the second section 54 defines a path which is generally consistent in terms of radial measurement from the center of the second opening 44 from the inner end 52 to a second outer end 56.

In one embodiment of the present invention, the first element 22 further includes a plurality of aligning elements 58 for engaging the second sections 54 and where the two elements 23A, 23B are used for positioning and interconnecting the elements 23A, 23B of the first element 22. Each aligning element 58 is disposed between an adjacent pair of guides 32 and extends parallel to the force transfer element 38. Apertures 60 are formed in the first elements 23A, 23B to receive and engage the aligning elements 58. In operation, each one of the aligning elements 58 engages one of the second sections 54 so that during relative angular movement between the first element 22 and the second element 24, or first and second elements, respectively, the first and second openings 30, 44 remain concentrically aligned. It will be recognized by those of skill in the art that the second sections 54 46 engage the aligning elements 58 in response to the forces induced by the divergent path of the first sections 48 on the force transfer elements 38. As a result, not only do the first and second openings 30, 44 remain concentrically aligned, but the gripping elements 26 are actuated along the guides 32 with equal, likewise displacement.

Figure 2:
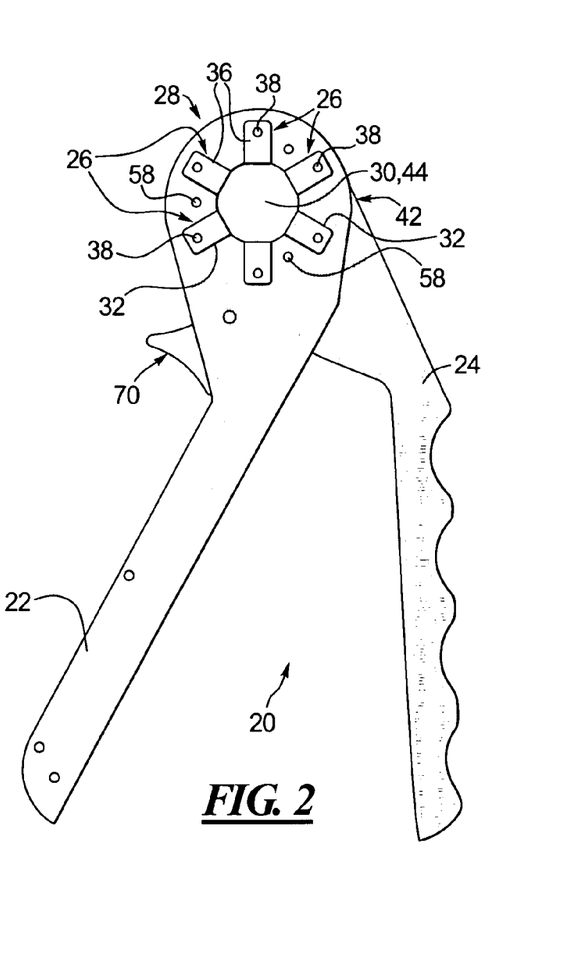
FIG. 2 is a top plan view of the adjustable gripping tool of FIG. 1 disposed in an open or first operative position.
Figure 3:
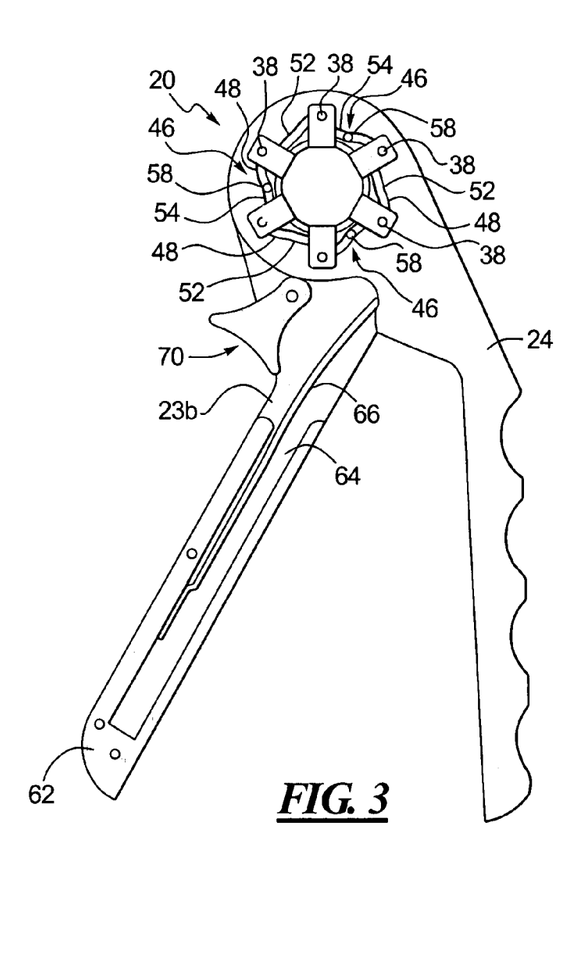
FIG. 3 is a sectioned view of the adjustable gripping tool of FIG. 2 wherein one component of a first element has been removed.

A spacer 62 may be used to interconnect the elements 23A, 23B to define a pocket 64 such that a spring 66 disposed within the pocket contacts the second element 24 in order to dispose the second element is a normally open position (see FIGS. 2 and 3). The spacer may be connected to each of the elements 23A, 23B by press fit pins 66 engaging aligned apertures 68 or any other suitable device or in any other suitable manner.

A lock mechanism 70 is connected to the first element 22 such that operative movement of the lock mechanism 70 from a first operative position (see FIGS. 4 and 5) to a second operative position (see FIGS. 2 and 3) secures the first element 22 and second element 24 in any desired angular orientation. The lock mechanism 70 may be connected between the elements 23A, 23B by a press fit pin 72 engaging aligned apertures 74 or by any other suitable device or in any other suitable manner. The inner or operative end 76 of the lock mechanism 70 is configured as a cammed or eccentric surface. In one embodiment, this may be achieved by disposing aperture 74 offset from the longitudinal axis of the lock mechanism 70. Alternatively, an eccentric shaped surface may be defined on the inner or operative end 76 or by any other suitable manner.

When oriented in the first operative position (See FIGS. 4 and 5), the inner end 76 of the lock mechanism 70 defines a clearance (82, see FIG. 6) with respect to the second element 24. Movement of the actuating end 78 of the lock mechanism 70 from the first operative position to the second operative position (See FIGS. 2 and 3) moves the inner end 76 about the aperture 74 such that the operative end 76 binds against the second element 24 thereby securing the first element and second element in a desired angular orientation.

In one embodiment of the present invention, the gripping portion 28 includes six gripping elements 26. However, it would be recognized by those of skill in the art, that the gripping portion 28 need include only at least two gripping or engaging elements 26 and that any other suitable number of gripping or workpiece engaging elements may be provided.

FIG. 2 illustrates the adjustable gripping tool of FIG. 1 disposed in an open position. The second element 24 is biased from the first element 22 as described above to maintain such open position.

The lock mechanism 70 is disposed in the second operative position securing the first element 22 and second element 24 a desired angular orientation. The adjustable gripping tool 20 of this embodiment is configured such that the gripping portion 28 and the actuation portion 42 are adapted to circumferentially engage the workpiece. However, in FIG. 2, the gripping elements 26 are disposed such that the arms 36 engage the guides 32 in a manner which is characteristic of the open position of the adjustable gripping tool 20. The force transfer elements 38 and aligning elements 58 are shown as force transfer elements press fit to the gripping elements 26 and first element 22 respectively. Alternatively, the force transfer elements can be manufactured as a protrusion of the gripping or workpiece engaging element.

FIG. 3 illustrates a section view of the adjustable gripping tool 20 of FIG. 2 wherein one element of the first element 22 has been removed. Element 23B is shown having spacer 62 connected thereto to define a pocket 64 such that the spring 66 disposed within the pocket 64 contacts the second element 24 to bias the second element 24 in the open position. As described above, the lock mechanism 70 is engaged in the second operative position securing the first element 23B and second element 24 in the desired open position. Aligning elements 58 are disposed at the inner end 52 of the slot 46 which defines a point of separation between the first section 48 and the second section 54. The force transfer elements 38 are disposed at the outer end 50 of the first section 48 of the slot 46 as will be shown and described in more detail below.

Figure 4:
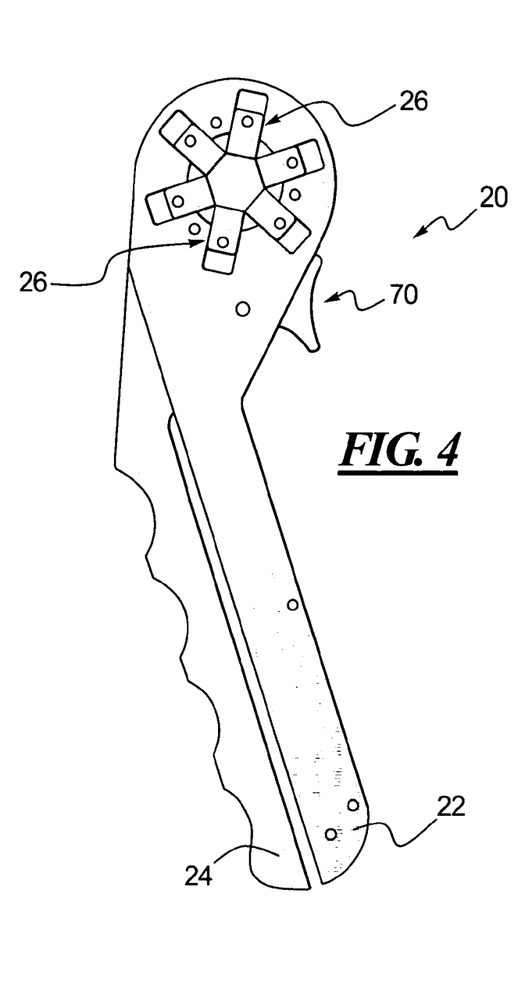
FIG. 4 is a top plan view of the adjustable gripping tool of FIG. 1 disposed in a closed or second operative position.

FIG. 4 illustrates an adjustable gripping tool 20 disposed in a closed position wherein the first element 22 and second element 24 are disposed immediately adjacent. The lock mechanism 70 is disposed in the first operative position, unlocked. The gripping elements 26 have been moved from an open position, as shown in FIGS. 2 and 3, to a closed position such that the gripping elements are adapted for engaging the workpiece.

Figure 5:
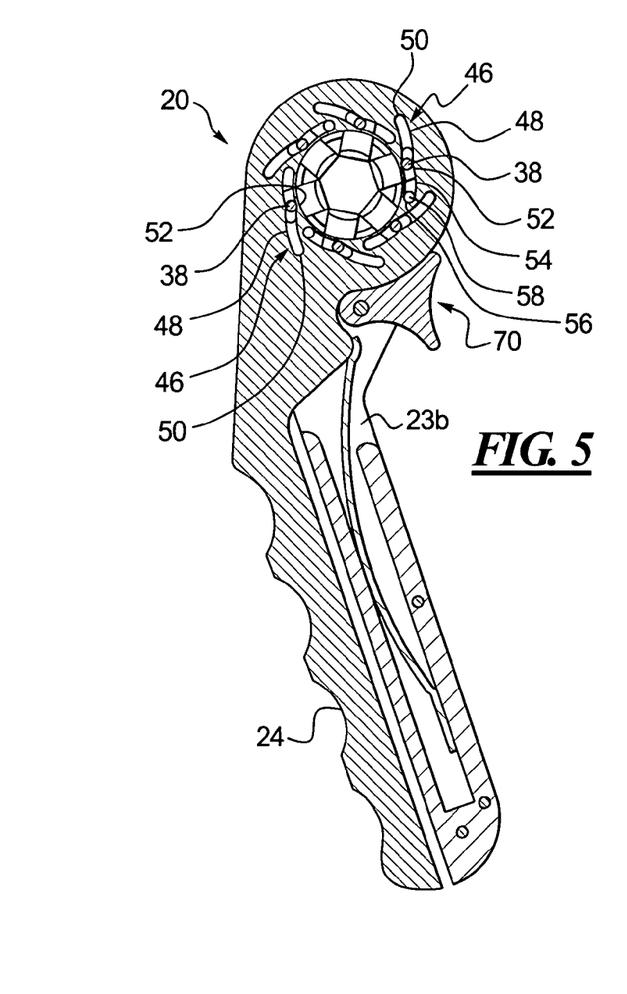
FIG. 5 is a sectional view of the adjustable gripping tool of FIG. 4 taken along a line passing through a second element of the adjustable gripping tool.

FIG. 5 illustrates a section view of the adjustable gripping tool 20 of FIG. 4 taken through the second element where the adjustable gripping tool is disposed in the second operative or closed position. The first element is represented by element 23B which is disposed immediately adjacent the second element 24. The force transfer elements 38 have been moved as a result of contact with the first section 48 of the slots 46 from an outer end 50 to an inner end 52. The aligning elements 58 have been moved from an inner end from the second section 54 of the slot 56 to an outer end 56. It will be recognized by those of skill in art that the paths defined by the first and second sections 48, 54 of the slot 46 are divergent. The aligning elements 58 engage the second portion 54 of the slot 46 in order to maintain proper orientation between the first element 22 and the second element 24. The force transfer elements 38 engage the first portion 48 of the slot 46 such that the generally decreasing diameter dimension of the path defined by the first portion 48 causes the force transfer elements to move closer to the center of the first and second openings 30, 44. Accordingly, the gripping elements 26 are likewise actuated along the guides 32 to engage the workpiece. The lock mechanism 70 is disposed in a first operative position. It should also be noted that the slots can be reversed and the action reversed such that the actuation elements are radiating from the center during activation.

Figure 6:
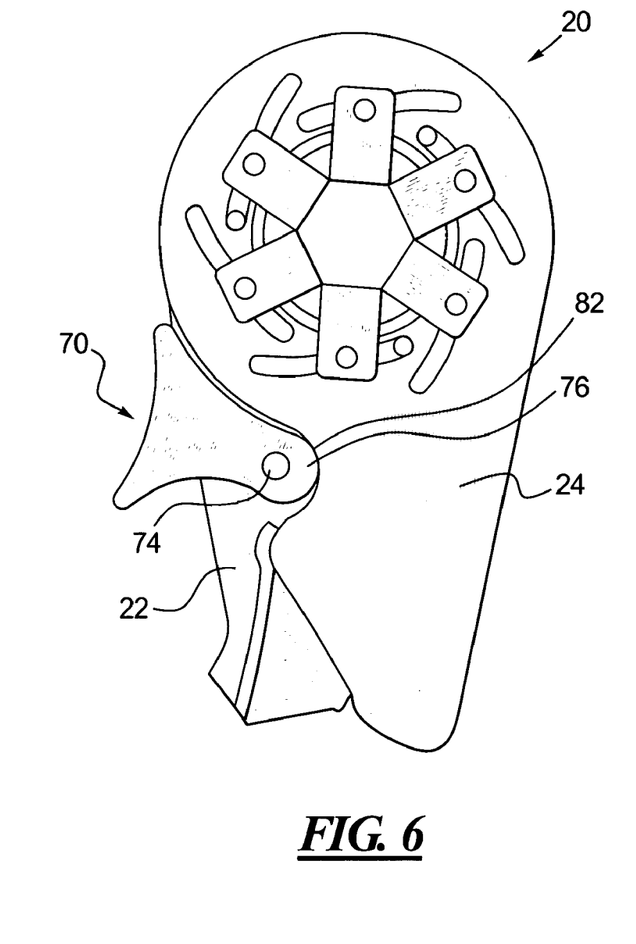
FIG. 6 is a detailed broken-away section view of the adjustable gripping tool of FIG. 6 wherein one element of the first component has been removed.

FIG. 6 illustrates a detailed broken away view of the adjustable gripping tool 20 of FIGS. 4 and 5. The lock mechanism 70 is disposed in a first operative or open position. The lock mechanism 70 is connected to the first element 22 by a pin 74 which is disposed offset from a longitudinal axis of the lock mechanism 70, such that in this first operative position, a clearance 82 is defined between the lock mechanism operative or inner end 76 and the second element 24.

Figure 7:
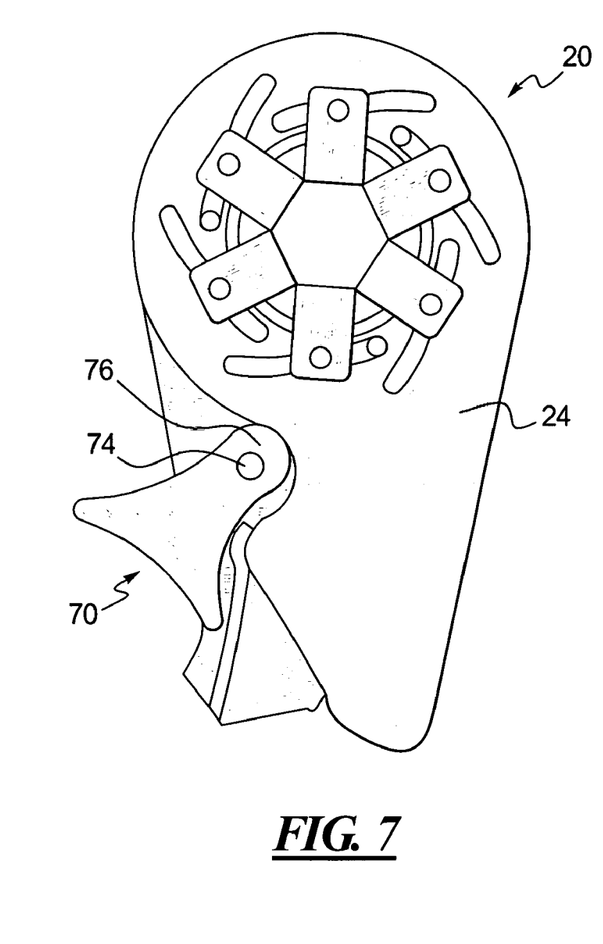
FIG. 7 is a detailed broken-away section view of the adjustable gripping tool of FIG. 6 wherein the lock mechanism is disposed in a locked or second operative position.

FIG. 7 illustrates the adjustable gripping tool 20 of FIG. 6 wherein the lock mechanism 70 has been moved from the first operative position (shown in FIG. 6) to a second operative position. As a result of movement of the lock mechanism 70 the clearance is eliminated between the operative or inner end 76 and the second element 24. Accordingly, the lock mechanism 70 binds against the second element 24 such that the first element and second element 24 cannot be moved relative to one another without first releasing the lock mechanism 70. It will be recognized by those of skill in the art that the pin 74 used to mount the lock mechanism 70 to the first element 22 is most often offset from the longitudinal axis of the lock mechanism 70. However, an eccentric surface at the inner or operative end 76 may also be formed to enable the same function.

Figure 8:
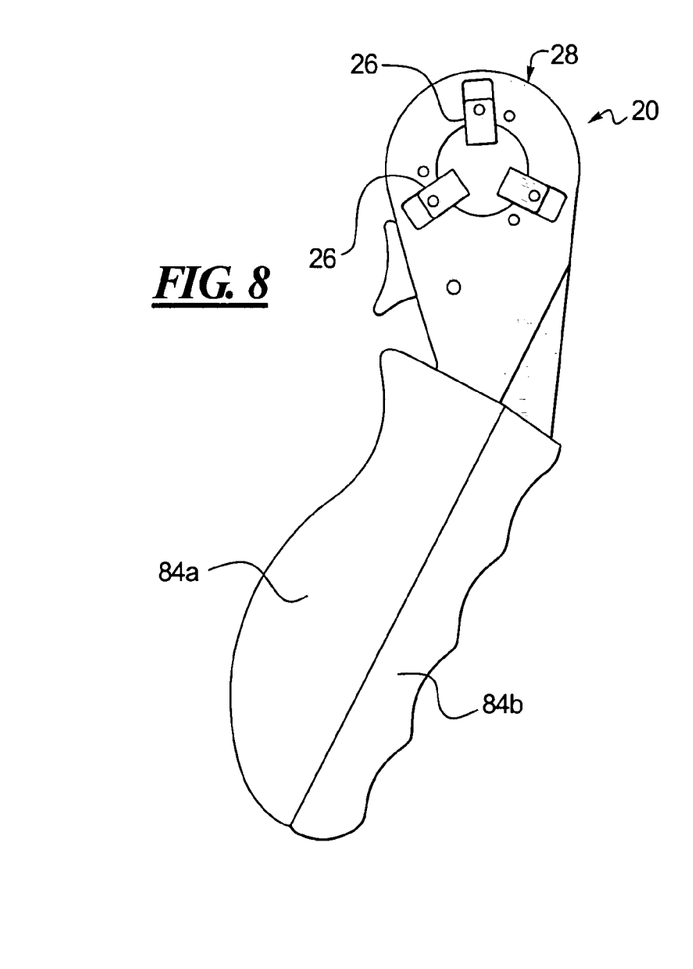
FIG. 8 is a top plan view of another embodiment of an adjustable gripping tool in accordance with the principles of the present invention.

FIG. 8 illustrates another embodiment of the present invention of the adjustable gripping tool 20 wherein only three gripping elements 26 are shown. It is within the teaching of the present invention that the gripping portion 28 only include at least one gripping element 26. Grips 84A, 84B may also be provided for the first element 22 and second element 24 to further facilitate effective actuation of the adjustable gripping tool 20. The remaining structure and function of this disembodiment of the present invention remains the same as detailed above.

Figure 9:
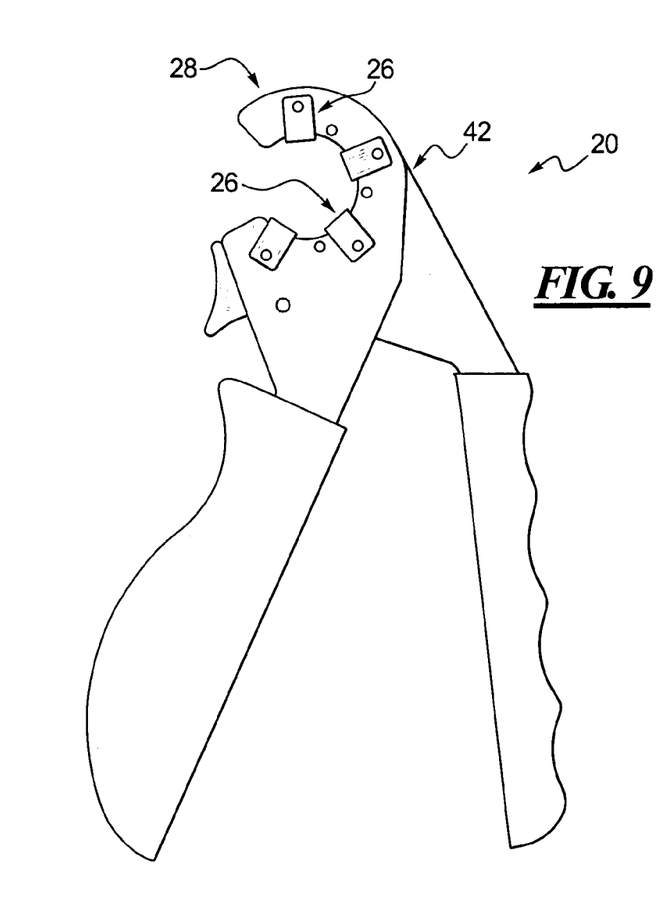
FIG. 9 is a top plan view of yet another embodiment of an adjustable gripping tool in accordance with the principles of the present invention.

FIG. 9 illustrates yet another embodiment of the present invention directed to an adjustable gripping tool 20. In this embodiment of the present invention, the gripping portion 28 and the actuation portion 42 are configured penannular. Such configuration enables the wrench 20 to engage the workpiece laterally or in a radial direction. Further, four gripping elements 26 are illustrated in this embodiment. The remaining structural and functional elements and aspects of this embodiment of the present invention remain the same as detailed above.

Figure 10:
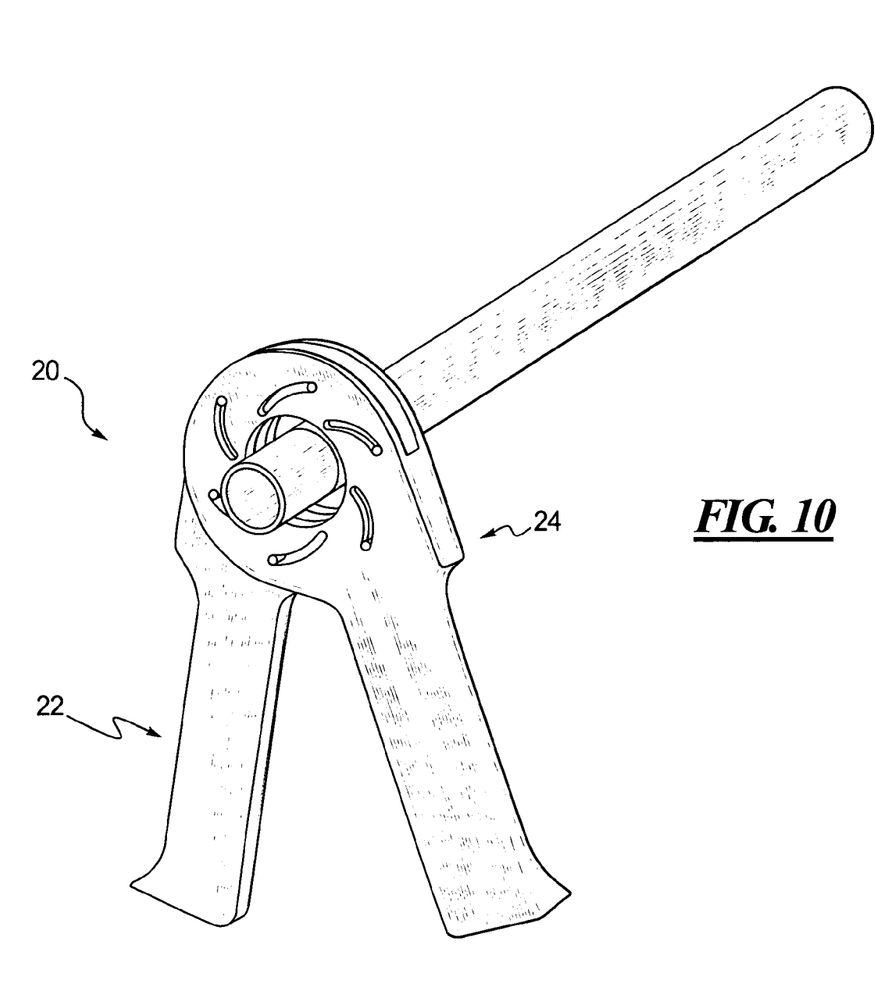
FIG. 10 is a perspective view of another embodiment of an adjustable gripping tool in accordance with the principles of the present invention.

FIG. 10 illustrates another embodiment of the present invention wherein the adjustable gripping tool 20 is configured as a cutting or scoring device for engaging, for example, a tubular element. In this embodiment, the second element 2A is configured substantially U-shaped. Such configuration may be achieved by binding, folding or otherwise forming a unitary element as shown in FIG. 10. It will be recognized by those of skill in the art that the orientation of some of the structural elements in this embodiment have been in comparison to the configuration of the tools above. Otherwise, the operation and function of this embodiment is as described above.

The first and second elements 22, 24 are connected for relative angular movement in order to generate linear movement of the gripping elements. It is within the teachings of the present invention that the gripping elements may also be configured to score or cut a workpiece. For example, in one embodiment, the gripping elements described above which are configured to engage the workpiece as described above may be replaced with gripping elements configured to perform the scoring or cutting functions.

Figure 11:
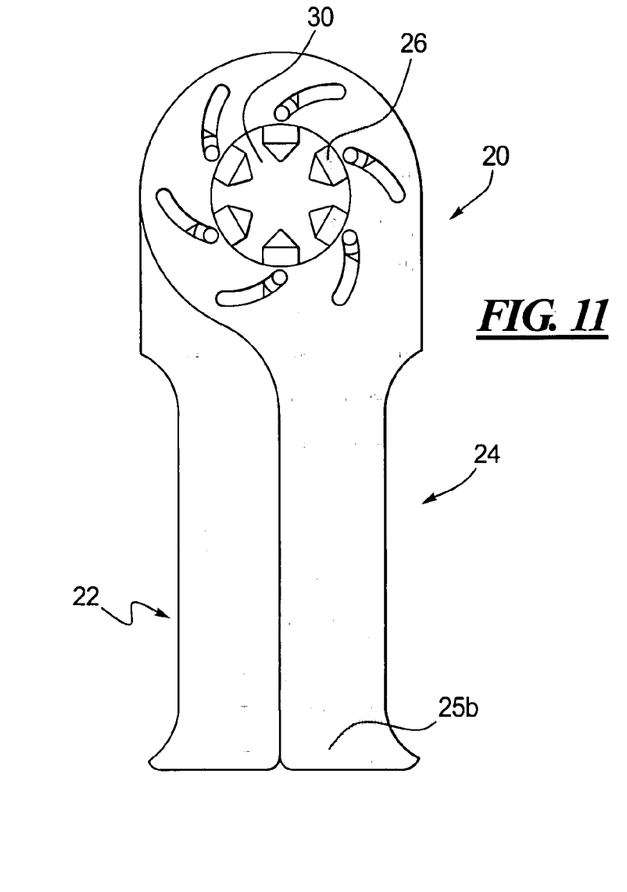
FIG. 11 is a top plan view of the adjustable gripping tool of FIG. 10, disposed in a closed or second operative position.

FIG. 11 illustrates a top plan view of the embodiment of the present invention in FIG. 10 disposed in a closed position. The first and second elements 22, 24 have been moved toward one another such that the gripping elements 26 extend into the first opening 30 to engage a workpiece (not shown). As shown in FIG. 10, this embodiment is configured to engage a tubular element, such as a pipe or other suitable workpipe. For example, a polyvinyl chloride ("PVC") pipe may be cut or scored with the sharp-edged gripping elements of this embodiment and not distort the PVC pipe. As a result, in addition to a clean perpendicular cut-off, the PVC pipe is not deformed so that further coupling is problematic. Otherwise, this embodiment functions in accordance with the other tools described above.

Figure 12:
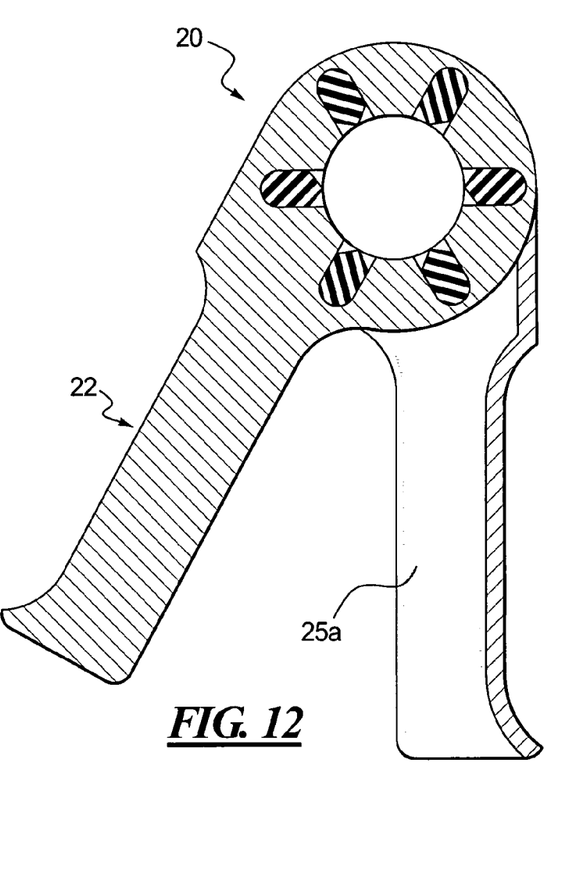
FIG. 12 is a sectional view of the adjustable gripping tool of FIG. 11 taken along a line passing through the second element of the adjustable gripping tool.

FIG. 12 illustrates a sectional view of the adjustable gripping tool 20 of FIG. 10 taken through the first element 22, where the tool 20 is disposed in an open position. The gripping element 26 disposed within the guides 32 include all the structural elements as described above. However, rather than a U-shaped body, a force transfer element extends from each side of the body portion to engage the slots of the pair of elements 25a, 25b (25b in FIG. 11) which comprise the second element 24.

Figure 13:
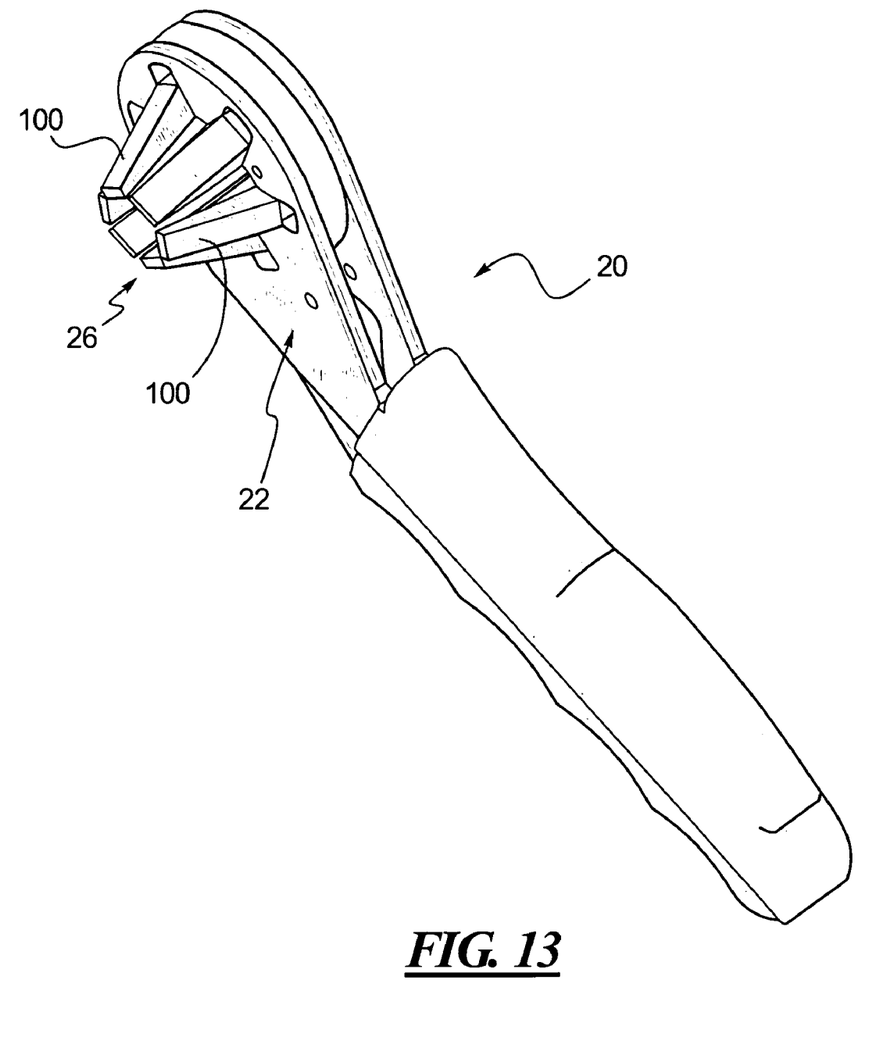
FIG. 13 is a perspective view of another embodiment of an adjustable gripping tool in accordance with the principal aspects of the present invention.

FIG. 13 illustrates a perspective view of another embodiment of an adjustable gripping tool in accordance with the principal aspects of the present invention. In this embodiment of the present invention, the adjustable gripping tool 20 includes gripping elements 26 which have extensions 100 that extend beyond the first element 22. The extensions 100 facilitate engaging workpieces disposed in a space-limited location, where access for the entire tool 20 may be difficult or problematic. The remaining structural and functional elements and aspects of this embodiment of the present invention remain the same as detailed above. Alternatively, other structural elements may be formed on the extensions 100 to enable additional functions for the tool 20, such as crimping, cutting, or any other suitable function.

The inventions is not limited to the details of the apparatus depicted and other modification and applications may be contemplated. For example, the force transfer elements and aligning elements may be changed as desired for other bearing elements. The gripping elements themselves may ha be varied in size, shape, or quantity. And the gripping elements may have a cutter, roller or blade attached to perform cutting or scoring operations. Also, the size, shape and position of the openings may be altered as desired to suit particular applications. Certain other changes may be made in the above-described apparatus without departing from true spirit and scope of the invention here involved. It is intended, therefor that the subject matter of the above depiction shall be interpreted as illustrated and not in a limiting sense.

What is claimed is:

1. An adjustable gripping tool for engaging a workpiece to impart work thereto, the tool comprising:

a first element and a second element connected for relative angular movement which generates movement of at least one gripping element;

the first element including a gripping portion configured to engage the workpiece including a first opening, at least one guide extending from the first opening and the at least one gripping element;

each at least one gripping element including a body portion adapted for engaging the workpiece, an arm portion configured to engage one of said at least one guide and a force transfer element contiguous with the arm portion;

the second element including an actuation portion having a second opening concentric with the first opening and at least one slot disposed adjacent the second opening external thereto, each said at least one slot having a first section configured to engage the force transfer element of one said at least one grinning element, such that movement of the second element with respect to the first element actuates each at least one first section to contact and move each respective force transfer element thereby actuating each said at least one gripping element along respective said at least one guide.

2. The gripping tool as recited in claim 1, further including a lock mechanism disposed on the first element operable to secure the first element and second element in a desired angular orientation.

3. An adjustable gripping tool for engaging a workpiece to impart work thereto, the tool comprising:
   a first element and a second element connected for relative angular movement which generates movement of at least one gripping element;
   wherein the first element includes a pair of elements disposed on opposing sides of the second element;
   the first element including a gripping portion configured to engage the workpiece including a first opening, at least one guide extending from the fist opening and the at least one gripping element;
   each at least one gripping element including a body portion adapted for engaging the workpiece, an arm portion configured to engage one of said at least one guide and a force transfer element contiguous with the arm portion;
   the second element including an actuation portion having a second opening concentric with the first opening and at least one slot disposed adjacent the second opening, each said at least one slot having a first section configured to engage the force transfer element of one said at least one gripping element, such that movement of the second element with respect to the first element actuates each at least one first section to contact and move each respective force transfer element thereby actuating each said at least one gripping element along respective said at least one guide.

4. The gripping tool as recited in claim 3, wherein a spacer interconnects the elements to define a pocket such that a spring disposed within the pocket contacts the second element so that the second element is normally disposed in an open position.

5. An adjustable gripping tool for engaging a workpiece to impart work thereto, the tool comprising:
   a first element and a second element connected for relative angular movement which generates movement of at least one gripping element;
   the first element including a gripping portion configured to engage the workpiece including a first opening, at least one guide extending from the first opening and the at least one gripping element;
   each at least one gripping element including a body portion adapted for engaging the workpiece, an arm portion configured to engage one of said at least one guide and a force transfer element contiguous with the arm portion;
   wherein the aim portion of the gripping elements further includes a pair of arms disposed at opposite ends of the body portion such that the gripping elements are substantially U-shaped;
   the second element including an actuation portion having a second opening concentric with the first opening and at least one slot disposed adjacent the second opening, each said at least one slot having a first section configured to engage the force transfer element of one said at least one gripping element, such that movement of the second element with respect to the first element actuates each at least one first section to contact and move each respective force transfer element thereby actuating each said at least one gripping element along respective said at least one guide.

6. The gripping tool as recited in claim 1, wherein the first element further includes a plurality of studs such that one stud is disposed between an adjacent pair of guides and extends parallel to die force transfer elements.

7. The gripping tool as recited in claim 6, wherein each of the slots further includes a second section extending from the first section, such that one of the studs engages one of the second sections so that during relative angular movement between the first element and the second element the first and second openings remain concentrically aligned.

8. The gripping tool as recited in claim 7, wherein the first and second sections are divergent.

9. The gripping tool as recited in claim 1, wherein the gripping portion and actuation portion circumferentially engage the workpiece.

10. The gripping tool as recited in claim 1, wherein the griping portion and actuation portion are configured penannular.

11. The gripping tool as recited in claim 1, wherein the gripping portion includes a plurality of gripping elements.

12. The gripping tool as recited in claim 3, wherein a lock mechanism is connected to the first element between the elements such that movement of the lock mechanism from a first operative position to a second operative position secures the first ement and second element in a desired angular orientation.

13. An adjustable gripping tool for engaging a workpiece to impart work thereto, the tool comprising:
   a first element and a second element connected for relative angular, movement which generates movement of at least one gripping element;
   the first element including a gripping portion configured to engage the workpiece including a first opening, at least one guide extending from the first opening and the at least one gripping element;
   each at least one gripping element including a body portion adapted for engaging the workpiece, an arm portion configured to engage one of said at least one guide and a force transfer element contiguous with the arm portion;
   the second element including an actuation portion having a second opening concentric with the first opening and at least one slot disposed adjacent the second opening, each said at least one slot having a first section configured to engage the force transfer element of one said at least one gripping element, such that movement of the second element with respect to the first element actuates each at least one first section to contact and move each respective force transfer element thereby actuating each said at least one gripping element along respective said at least one guide;
   wherein the gripping elements performing one function may be replaced with gripping elements performing a different function.

14. An adjustable gripping tool for engaging a workpiece to impart work thereto, the tool comprising:
   a first element and a second element connected for relative angular movement which generates movement of at least one gripping element;
   the first element including a gripping portion configured to engage the workpiece including a first opening, at least one guide extending from the first opening and the at least one gripping element;

each at least one griping element including a body portion adapted for engaging the workpiece, an arm portion configured to engage one of said at least one guide and a force transfer element contiguous with the arm portion;

the second element including an actuation portion having a second opening concentric with the first opening and at least one slot disposed adjacent the second opening, each said at least one slot having a first section configured to engage the force transfer element of one said at least one gripping element, such that movement of the second element with respect to the first element actuates each at least one first section to contact and move each respective force transfer element thereby actuating each said at least one gripping element along respective said at least one guide;

wherein the gripping elements score and cut.

15. An adjustable gripping tool for engaging a workpiece to impart work thereto, the tool comprising:

a first element and a second element connected for relative angular movement which generates movement of at least one gripping element;

the first element including a gripping portion configured to engage the workpiece including a first opening, at least one de extending from the first opening and the at least one gripping element;

each at least one gripping element including a body portion adapted for engaging the workpiece, an arm portion configured to engage one of said at least one guide and a force transfer element contiguous with the arm portion;

the second element including an actuation portion having a second opening concentric with the first opening and at least one slot disposed adjacent the second opening each said at least one slot having a first section configured to engage the force transfer element of one said at least one gripping element, such that movement of the second element with respect to the first element actuates each at least one first section to contact and move each respective force transfer element thereby actuating each said at least one gripping element along respective said at least one guide;

wherein movement of the at least one gripping element is linear.

16. An adjustable gripping tool for engaging a workpiece to impart work thereto, the tool comprising:

a first element and a second element connected for relative angular movement which generates movement of at least one gripping element;

the first element including a gripping portion configured to engage the workpiece including a first opening, at least one guide extending from the first opening and the at least one gripping element;

each at least one gripping element including a body portion adapted for engaging the workpiece, an arm portion configured to engage one of said at least one guide and a force transfer element contiguous with the arm portion;

the second element including an actuation portion having a second opening concentric with the first opening and at least one slot disposed adjacent the second opening, each said at least one slot having a first section configured to engage the force transfer element of one said at least one gripping element, such that movement of the second element with respect to the first element actuates each at least one first section to contact and move each respective force transfer element thereby actuating each said at least one gripping element along respective said at least one guide;

wherein movement of the at least one gripping element in curvilinear.

17. The gripping tool recited in claim 1, wherein the at least one guide includes a plurality of guides.

18. The gripping tool as recited in claim 1, wherein each at least one guide extends radially.

19. The gripping tool as recited in claim 1, wherein each at least one guide extends along a curvilinear path.

20. An adjustable gripping tool for engaging a workpiece to impart work thereto, the tool comprising:

a first element and a second element connected for relative angular movement;

the second element including an actuation portion having a plurality of slots, each of the slots including a first section and a second section wherein the first and second sections each define divergent paths;

the first element including a gripping portion having a plurality of gripping elements, each gripping element having a force transfer element contiguous therewith, and at least one aligning element, where one of the aligning elements if disposed between a pair of gripping elements;

wherein one of the force transfer elements engages one first section and one of the aligning elements engages one second section such that movement of the second element relative to the first element results in the first sections contacting each of the aligning elements to actuate the gripping elements and the second sections contacting the aligning elements to maintain orientation of first element with respect to second element.

21. The gripping tool recited in claim 20, wherein the first element includes a first opening and the second element includes a second opening which are concentrically aligned during relative movement.

22. The gripping tool recited, in claim 20, wherein a lock mechanism is disposed on the fist element operative to secure the first element and second element in a desired angular orientation.

23. The gripping tool recited in claim 20, wherein the gripping portion and actuation portion circumferentially engage the workpiece.

24. The gripping tool recited in claim 20, wherein the gripping portion and actuation portion are configured pen-annular.

25. An adjustable gripping tool for engaging a workpiece to impart work thereto, the tool comprising:

a first element and a second element connected for relative angular movement;

the second element including an actuation portion having a plurality of slots, each of the slots including a first section and a second section wherein the first and second sections each define divergent paths;

the first element including a gripping portion having a plurality of gripping elements, each gripping element having force transfer element contiguous therewith, and at least one aligning element, where one of the aligning elements if disposed between a pair of gripping elements;

wherein the gripping elements performing one function may be replaced with gripping elements performing a different function;

wherein one of the force transfer elements engages one first section and one of the aligning elements engages one second section such that movement of the second element relative to the first element results in the first sections contacting each of the aligning elements to actuate the gripping elements and the second sections contacting the aligning elements to maintain orientation of first element with respect to second element.

26. An adjustable gripping tool for engaging a workpiece to impart work thereto, the tool comprising:
   a first element and a second element connected for relative angular movement;
   the second element including an actuation portion having a plurality of slots, each of the slots including a first section and a second section wherein the first and second sections each define divergent paths;
   the first element including a gripping portion having a plurality of gripping elements, each gripping element having a force transfer element contiguous therewith, and at least one aligning element, where one of the aligning elements if disposed between a pair of gripping elements;

wherein the gripping element can score and cut;

wherein one of the force transfer elements engages one first section and one of the aligning elements engages one second section such that movement of the second element relative to the first element results in the first sections contacting each of the aligning elements to actuate the gripping elements and the second sections contacting the aligning elements to maintain orientation of first element with respect to second element.

* * * * *

UNITED STATES PATENT AND TRADEMARK OFFICE
CERTIFICATE OF CORRECTION

PATENT NO. : 6,889,579 B1  Page 1 of 1
APPLICATION NO. : 10/763489
DATED : May 10, 2005
INVENTOR(S) : Daniel P. Brown It is certified that error appears in the above-identified patent and that said Letters Patent is hereby corrected as shown below:

Col. 9, Line 1, Claim 1: Delete "grinning" and replace with "gripping"

Signed and Sealed this

Seventeenth Day of July, 2012

David J. Kappos
*Director of the United States Patent and Trademark Office*